US009971159B2

(12) United States Patent
Hertwig et al.

(10) Patent No.: US 9,971,159 B2
(45) Date of Patent: May 15, 2018

(54) REFLECTIVE LASER LINE-BEAM GENERATOR

(71) Applicant: Coherent, Inc., Santa Clara, CA (US)

(72) Inventors: Michael Hertwig, San Ramon, CA (US); Andrea Caprara, Palo Alto, CA (US); Michele Wayne Winz, Woodburn, OR (US); Sergei Govorkov, Los Altos, CA (US)

(73) Assignee: Coherent, Inc., Santa Clara, CA (US)

( * ) Notice: Subject to any disclaimer, the term of this patent is extended or adjusted under 35 U.S.C. 154(b) by 23 days.

(21) Appl. No.: 15/297,564

(22) Filed: Oct. 19, 2016

(65) Prior Publication Data

US 2018/0107006 A1 Apr. 19, 2018

(51) Int. Cl.
*G02B 5/08* (2006.01)
*G02B 27/09* (2006.01)
*G02B 5/10* (2006.01)
*G02B 27/30* (2006.01)
*G02B 27/28* (2006.01)

(52) U.S. Cl.
CPC ......... *G02B 27/0927* (2013.01); *G02B 5/10* (2013.01); *G02B 27/0983* (2013.01); *G02B 27/283* (2013.01); *G02B 27/30* (2013.01)

(58) Field of Classification Search
CPC ........ G02B 5/10; G02B 5/08; G02B 27/0927; G02B 27/0983; G02B 27/283; G02B 27/30; G02B 27/0977; G02B 27/0905
USPC .......................................................... 359/838
See application file for complete search history.

(56) References Cited

U.S. PATENT DOCUMENTS

| 2,416,405 | A | 2/1947 | Purpura |
| 4,335,939 | A | 6/1982 | Stovell et al. |
| 4,826,299 | A | 5/1989 | Powell |
| 5,285,320 | A | 2/1994 | Hohberg |
| 5,440,423 | A | 8/1995 | Ogura |
| 7,400,457 | B1 | 7/2008 | Cayer |
| 2006/0012863 | A1 | 1/2006 | Goelles et al. |
| 2010/0128354 | A1* | 5/2010 | Chang ................ G02B 27/0977 359/627 |

(Continued)

FOREIGN PATENT DOCUMENTS

GB 2416405 A 1/2006

OTHER PUBLICATIONS

Homburg et al., "Gaussian-to-Top-Hat Beam Shaping—An Overview of Parameters, Methods and Applications", Proc. of SPIE, vol. 8236, 2012, pp. 82360A-1-82360A-9.

(Continued)

*Primary Examiner* — Euncha Cherry
(74) *Attorney, Agent, or Firm* — Morrison & Foerster LLP (57) ABSTRACT

A mirror is used to form a beam of laser-radiation having a uniform intensity distribution from a beam of laser-radiation having a non-uniform intensity distribution. The mirror has a reflective surface that has a compound shape, which is two inclined surfaces joined by a rounded apex. The compound-mirror is achromatic and can form a uniform intensity distribution from a polychromatic beam of laser-radiation. The uniform intensity distribution may be an isotropic distribution or a flat-top distribution in a plane. The non-uniform intensity distribution may be a Gaussian distribution from a laser source.

20 Claims, 12 Drawing Sheets (56) References Cited

U.S. PATENT DOCUMENTS

2014/0076863 A1     3/2014   Moffitt
2014/0227890 A1     8/2014   Hawryluk et al.

OTHER PUBLICATIONS

"Off-Axis Parabolic Mirrors with Holes Parallel to Collimated Beam", Thorlabs, available at https://www.thorlabs.us/newgrouppage9.cfm?objectgroup_id-8172, Sep. 5, 2016, 2 pages.
"Off-Axis Parabolic Mirrors with Holes Parallel to Focused Beam", Thorlabs, available at https://www.thorlabs.us/newgrouppage9.cfm?objectgroup_id-7197, Sep. 5, 2016, 4 pages.
"Coherent- Technologies to Generate Laser Lines", Machine Vision Newsletter, vol. 1, May 2014, 5 pages.
Willstrand, Ola, "Intensity Distribution Conversion from Gaussian to Top-Hat in a Single-Mode Fiber Connector", Lund University, Jan. 25, 2013, 53 pages.
Hanes et al., "A Reflective Field Mapping Beam Shaper for Creating a Gaussian Intensity Distribution from a Uniform Intensity High Energy Laser Beam", Proceedings of SPIE—The International Society for Optical Engineering, vol. 5525, 2004, pp. 98-103.
International Search Report and Written Opinion received for PCT Patent Application No. PCT/US2017/055929, dated Jan. 19, 2018, 14 pages.
Takaoka et al., "Design of a Reflective Aspherical Surface of a Compact Beam-Shaping Device", Optical Review, vol. 13, No. 2, 2006, pp. 77-86.

\* cited by examiner

REFLECTIVE LASER LINE-BEAM GENERATOR

TECHNICAL FIELD OF THE INVENTION

The present invention relates in general to shaping laser-radiation. The invention relates in particular to shaping polychromatic laser-radiation having a non-uniform intensity distribution into polychromatic laser-radiation having a uniform intensity distribution.

DISCUSSION OF BACKGROUND ART

Lasers have become essential light-sources for uniform illumination in a wide range of applications, including surface inspection of semi-conductor materials, thermal annealing of display-screen glass, and rapid assay of bio-medical fluids. A common requirement is a beam of laser-radiation having an elongated cross-section to uniformly illuminate a line on a surface of a material or a lateral plane in a volume of transparent material. Such beams of laser-radiation are referred to generally as "flat-top beams" or "line-beams". Other applications require uniform illumination of a rectangular area on a surface of a material.

Optical resonators in many laser-sources have a lowest-order transverse mode that has a cross-sectional intensity distribution described by the Gaussian function. In the absence of optical aberration, optical output from such laser-sources has a Gaussian intensity distribution. Light output from single-mode optical fibers also has a Gaussian intensity distribution, to a good approximation. A beam of laser-radiation maintains a Gaussian intensity distribution, provided any surfaces the beam is reflected from, or any media the beam propagates through do not have optical aberrations.

A beam of laser-radiation propagates along a beam-axis defined by the propagation of the centroid of the cross-sectional intensity distribution. For a beam of laser-radiation having a Gaussian intensity distribution and power "P", the intensity "I(r)" at a transverse displacement "r" from the beam-axis is:

$$I(r) = \frac{2P}{\pi \omega^2} e^{\frac{-2r^2}{\omega^2}}, \quad (1)$$

where "$\omega$" is the beam-radius at $$13.5\% \left(\frac{1}{e^2}\right)$$

of the maximum intensity I(0) on the beam-axis. The beam-radius $\omega$ changes as the Gaussian beam of laser-radiation propagates through optical elements and through free space.

Diffractive optical elements (DOEs) provide one means to transform a beam of laser-radiation having a Gaussian intensity distribution into a line-beam. A DOE has a micro-structured pattern of lines or dots that spatially modifies the phase of transmitted laser-radiation. A line-beam is created by mutual interference of rays within the phase-modified transmitted laser-radiation. The size of micro-structured pattern required to create a line-beam by such interference is wavelength specific. For this reason, DOEs have severe chromatic aberration, whereby the width of line-beam created is different for each wavelength within a polychromatic beam of laser-radiation. A polychromatic beam of laser-radiation could have a broad spectral bandwidth or comprise multiple discrete wavelengths. Another disadvantage of DOEs is degraded image quality and power losses, due to rays diffracted into higher orders of the micro-structured pattern.

A Powell lens provides another means to transform a Gaussian beam of laser-radiation into a line-beam. A Powell lens has large spherical aberration in the center thereof, redistributing laser-radiation at the peak of the Gaussian beam away from the beam-axis. Towards the edges thereof, a Powell lens becomes essentially a prism, refracting peripheral laser-radiation of the Gaussian beam at a defined maximum angle from the beam-axis. Overall, transmitted laser-radiation is transformed into a diverging beam having a uniform intensity distribution on both sides of the beam-axis up to the maximum angle.

A Powell lens generally transforms a Gaussian beam of laser-radiation into a line-beam in one plane, as described in U.S. Pat. No. 4,826,299. A rectangular area on a planar surface may be uniformly illuminated by using two orthogonally oriented Powell lenses, located serially in a Gaussian beam of laser-radiation, as described in detail in U.S. Pat. No. 7,400,457. A Powell lens, however, also has severe chromatic aberration, which degrades a line-beam created from a polychromatic beam of laser-radiation.

There is need for an achromatic optical device for shaping a polychromatic beam of laser-radiation having a non-uniform intensity distribution into a beam of laser-radiation having uniform intensity distribution. There is particular need for an achromatic optical device for shaping a polychromatic beam of laser-radiation having a Gaussian intensity distribution into a beam of laser-radiation having a flat-top intensity distribution.

SUMMARY OF THE INVENTION

The present invention is directed to forming a beam of laser-radiation having an about uniform intensity distribution and a first-beam axis from a beam of laser-radiation having a non-uniform intensity distribution and a second beam-axis. Apparatus in accordance with the present invention comprises a substrate and a compound mirror-surface on the substrate. The compound mirror-surface has a rounded apex and is reflective to the beam of laser-radiation having the non-uniform intensity distribution. The beam of laser-radiation having the non-uniform intensity distribution is incident on the compound mirror-surface. The second beam-axis is incident on the rounded apex of the compound mirror-surface. The beam of laser-radiation having the about uniform intensity distribution is reflected from the compound mirror-surface.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
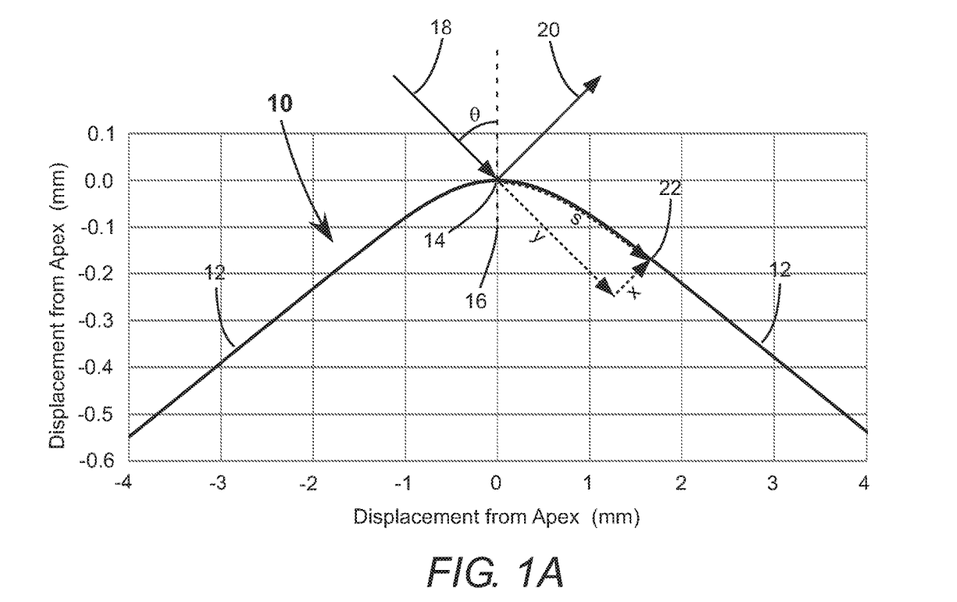
FIG. 1A is a graph schematically illustrating cross-sectional shape of a convex mirror-surface in accordance with the present invention, an apex of the mirror-surface located at the origin, the cross-sectional shape illustrated as displacement from the apex in one direction as a function of displacement from the apex in a perpendicular direction.

Referring now to the drawings, wherein like components are designated by like numerals, FIG. 1A schematically illustrates a mirror-surface 10 in accordance with the present invention. Mirror-surface 10 is convex, having a compound shape formed by two inclined planar surfaces 12 connected by a rounded apex 14. A normal 16 to rounded apex 14 is depicted as a dotted line. The compound shape of mirror-surface 10 is illustrated in cross-section by displacement parallel to normal 16 as a function of displacement perpendicular to normal 16. Rounded apex 14 is the origin of FIG. 1A for convenience of illustration.

Compound mirror-surface 10 is designed to receive and reflect an about collimated beam of laser-radiation 18 incident thereon, having a non-uniform intensity distribution and an angle-of-incidence θ in the direction depicted. Specifically, compound mirror-surface 10 is designed to receive and reflect beam of laser-radiation 18 having a Gaussian intensity distribution. The incident direction is significant because compound mirror-surface 10 is slightly asymmetric for a non-normal angle-of-incidence (θ≠0). Such an asymmetry is apparent in the drawing, by comparing the precise shape of compound mirror-surface 10 to the left and the right of rounded apex 14.

Compound mirror-surface 10 is designed to form a reflected beam of laser-radiation 20 that is diverging and has an about uniform intensity distribution in angle. "About uniform intensity distribution" is defined herein as an intensity distribution that varies by no more than 10% from the median intensity. Specifically, compound mirror-surface 10 is designed to form beam of laser-radiation 18 having an isotropic intensity distribution.

Figure 1B:
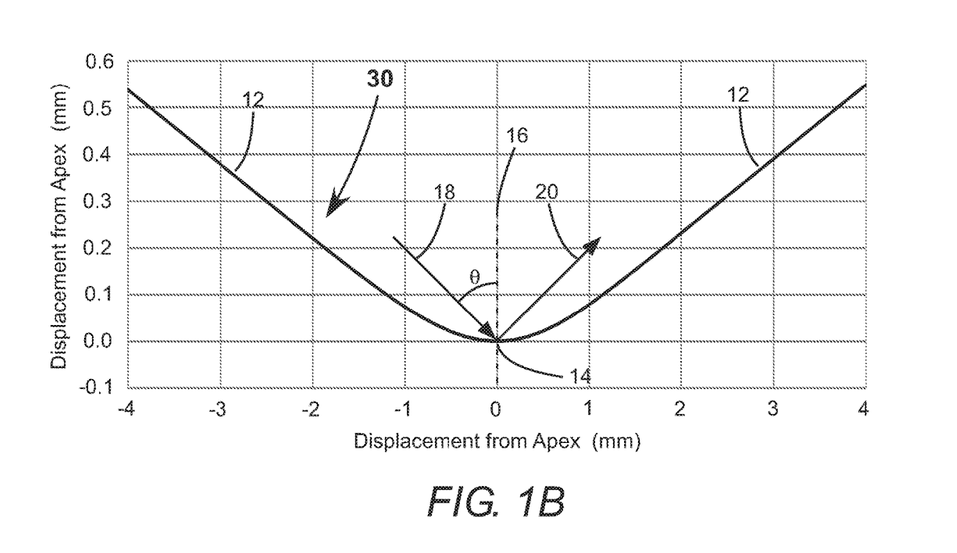
FIG. 1B is a graph schematically illustrating cross-sectional shape of a concave mirror-surface in accordance with the present invention, an apex of the mirror-surface located at the origin, the cross-sectional shape illustrated as displacement from the apex in one direction as a function of displacement from the apex in a perpendicular direction.

FIG. 1B schematically illustrates another compound mirror-surface 30 in accordance with the present invention. Compound mirror-surface 30 is similar to compound mirror-surface 10, but is concave. FIGS. 1A and 1B depict exemplary compound mirror-surfaces, each one having the precise shape for forming reflected beam of laser-radiation 20 diverging at a total angle of 36°, from incident beam of laser-radiation 18 having a Gaussian beam-radius ω of 1.0 (millimeter) mm and an angle-of-incidence θ of 45°. Equations for calculating the precise shape of compound mirror-surfaces 10 and 30 are presented herein below.

Figure 2A:
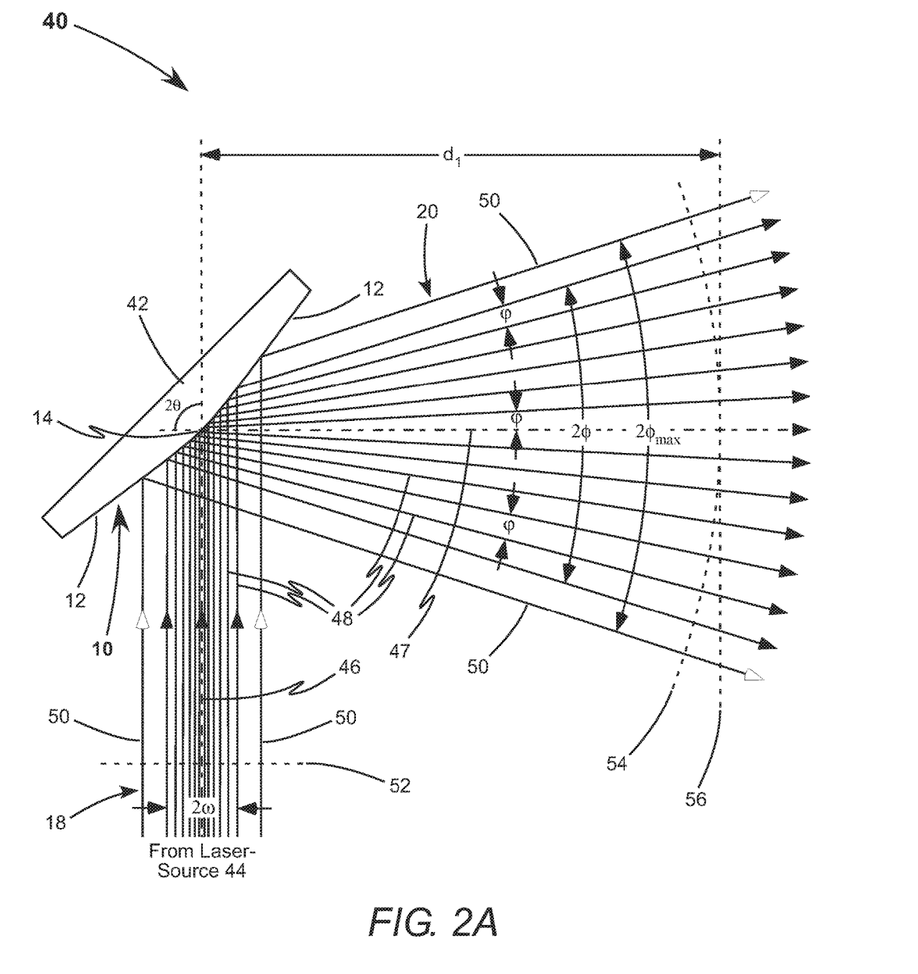
FIG. 2A schematically illustrates one preferred embodiment of flat-top beam generating apparatus in accordance with the present invention, including the convex mirror-surface of FIG. 1A, for forming a beam of laser-radiation having an isotropic intensity distribution from a beam of laser-radiation having a Gaussian intensity distribution.

FIG. 2A schematically illustrates a preferred embodiment 40 of flat-top beam generating apparatus in accordance with the present invention. Apparatus 40 includes compound mirror-surface 10, which is one surface of a substrate 42. Beam of laser-radiation 18 is generated by a laser-source 44 (not depicted). Beam of laser-radiation 18 could be monochromatic or polychromatic, without departing from the spirit and scope of the present invention. Compound mirror-surface 10 is preferably reflective for all wavelengths of beam of laser-radiation 18.

Beams of laser-radiation 18 and 20 are depicted having beam-axes 46 and 47, exemplary rays of laser-radiation 48 (filled arrowhead), and peripheral rays of laser-radiation 50 (unfilled arrowhead). One exemplary ray of laser-radiation propagates along the beam axes. Beam-axis 46 is incident on rounded apex 14 at angle-of-incidence θ. Exemplary rays of laser-radiation 48 are selected to span a total width of two Gaussian beam-radii (2ω) within beam of laser-radiation 18 and to have an isotropic distribution within beam of laser-radiation 20. Adjacent exemplary rays of laser-radiation 48 therefore diverge at a common angle φ within beam of laser-radiation 20. Exemplary rays of laser-radiation 48 span a total angle-of-divergence 2φ within beam of laser-radiation 20. Peripheral rays of laser-radiation 50 are incident on the two inclined planar surfaces 12 of compound mirror-surface 10. Peripheral rays of laser-radiation 50 in beam of laser-radiation 20 diverge from beam-axis 47 at the maximum angle-of-divergence $\Phi_{max}$. It should be noted that all the elements of FIG. 2A are rendered accurately to the same scale, including compound mirror-surface 10 and all the rays of laser-radiation.

Figure 2B:
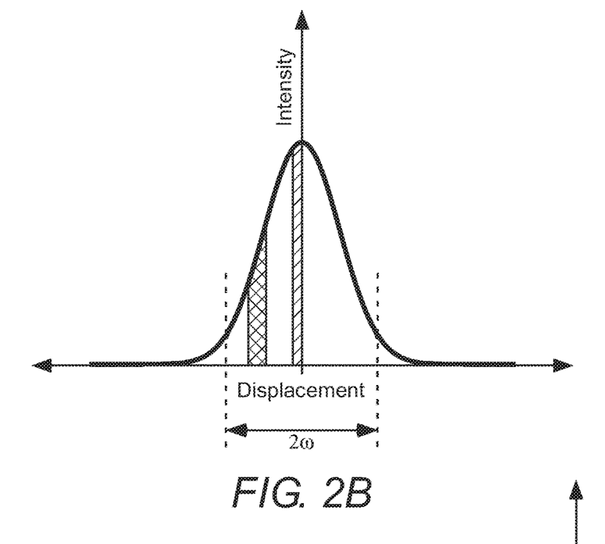
FIG. 2B schematically illustrates a Gaussian intensity distribution for a beam of laser-radiation in the flat-top beam generating apparatus of FIG. 2A.
Figure 2C:
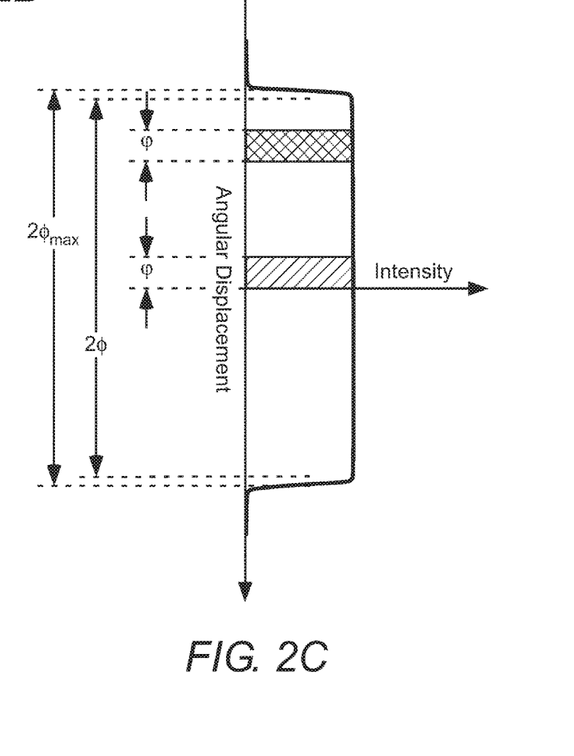
FIG. 2C schematically illustrates an isotropic intensity distribution for a beam of laser-radiation in the flat-top beam generating apparatus of FIG. 2A.

FIG. 2B schematically illustrates the Gaussian intensity distribution of beam of laser-radiation 18 in a transverse illumination plane 52 (shown in FIG. 2A). FIG. 2B is a graph of intensity of laser-radiation in transverse illumination plane 52 as a function of displacement from beam-axis 46. FIG. 2C schematically illustrates the isotropic intensity distribution of beam of laser-radiation 20 in a cylindrical illumination surface 54 (shown in FIG. 2A), which has a center-of-curvature located at rounded apex 14. Cylindrical illumination surface 54 has a radius-of-curvature of "$d_1$".
FIG. 2C is a graph of intensity of laser-radiation in cylindrical illumination surface 54 as a function of angular displacement from beam-axis 47.

FIG. 2C includes two hatched areas, each spanning the common angle φ, which contain the same fraction of the radiant power in beam of laser-radiation 20. FIG. 2B includes two corresponding hatched areas, bounded by the same exemplary rays of laser-radiation as the hatched areas in FIG. 2C, which contain the same fraction of the radiant power in beam of laser-radiation 18. Radiant power is transformed from the cross-hatched area of FIG. 2B to the cross-hatched area of FIG. 2C by reflection from compound mirror-surface 10. Similarly, radiant power is transformed from the diagonal-hatched area of FIG. 2B to the diagonal-hatched area of FIG. 2C. For exemplary compound mirror-surface 10 above, $\Phi_{max}$ is 18° and φ is 17.2° (0.955$\phi_{max}$).

Figure 3A:
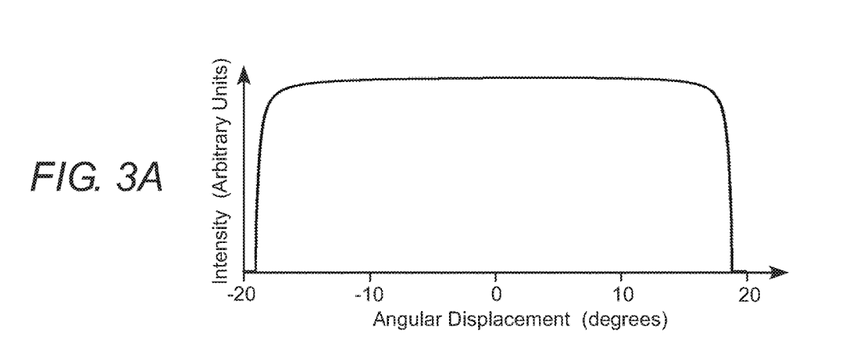
FIGS. 3A, 3B, and 3C schematically illustrate calculated intensity distributions for a beam of laser-radiation having an isotropic intensity distribution illuminating cylindrical surfaces having progressively larger radii-of-curvature, the center-of-curvature thereof located on the convex mirror-surface of the flat-top beam generating apparatus of FIG. 2A.
Figure 3B:
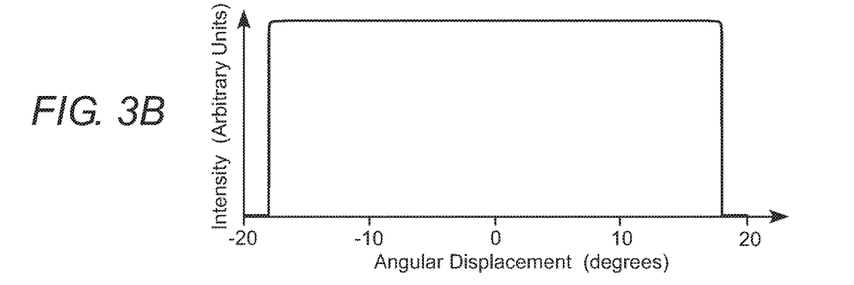
Figure 3C:
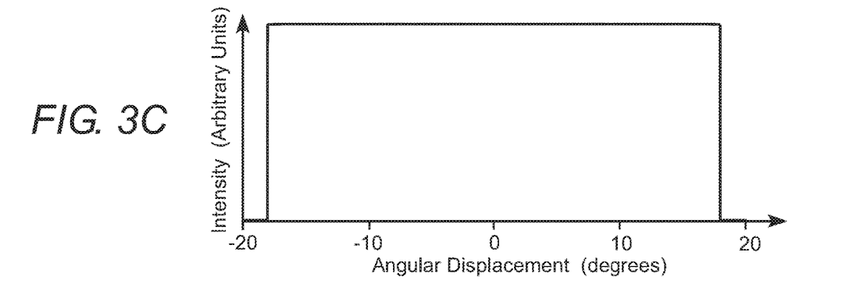
Figure 3D:
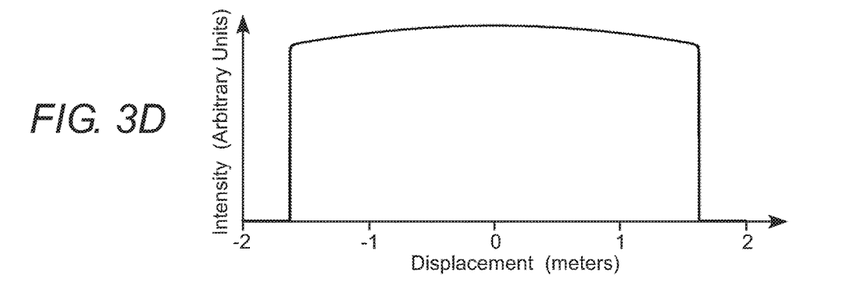
FIG. 3D schematically illustrates the calculated intensity distribution for a beam of laser-radiation having an isotropic intensity distribution illuminating a planar surface at a relatively large distance from the flat-top beam generating apparatus of FIG. 2A.

FIGS. 3A, 3B, and 3C schematically illustrate calculated intensity distribution of beam of laser-radiation 20 in cylindrical illumination surface 54 for respective radii-of-curvature $d_1$ of 0.1 meters (m), 5 m, and 50 m. Improved isotropic illumination is achieved at larger distances from compound mirror-surface 10. "Improved isotropic illumination" here means more uniform illumination between −18° and 18° and sharper edges at −18° and 18°. FIG. 3D schematically illustrates the calculated illumination of a transverse illumination plane 56 (shown in FIG. 2A) located at a distance $d_1$ of 5 m from rounded apex 14.

Figure 4:
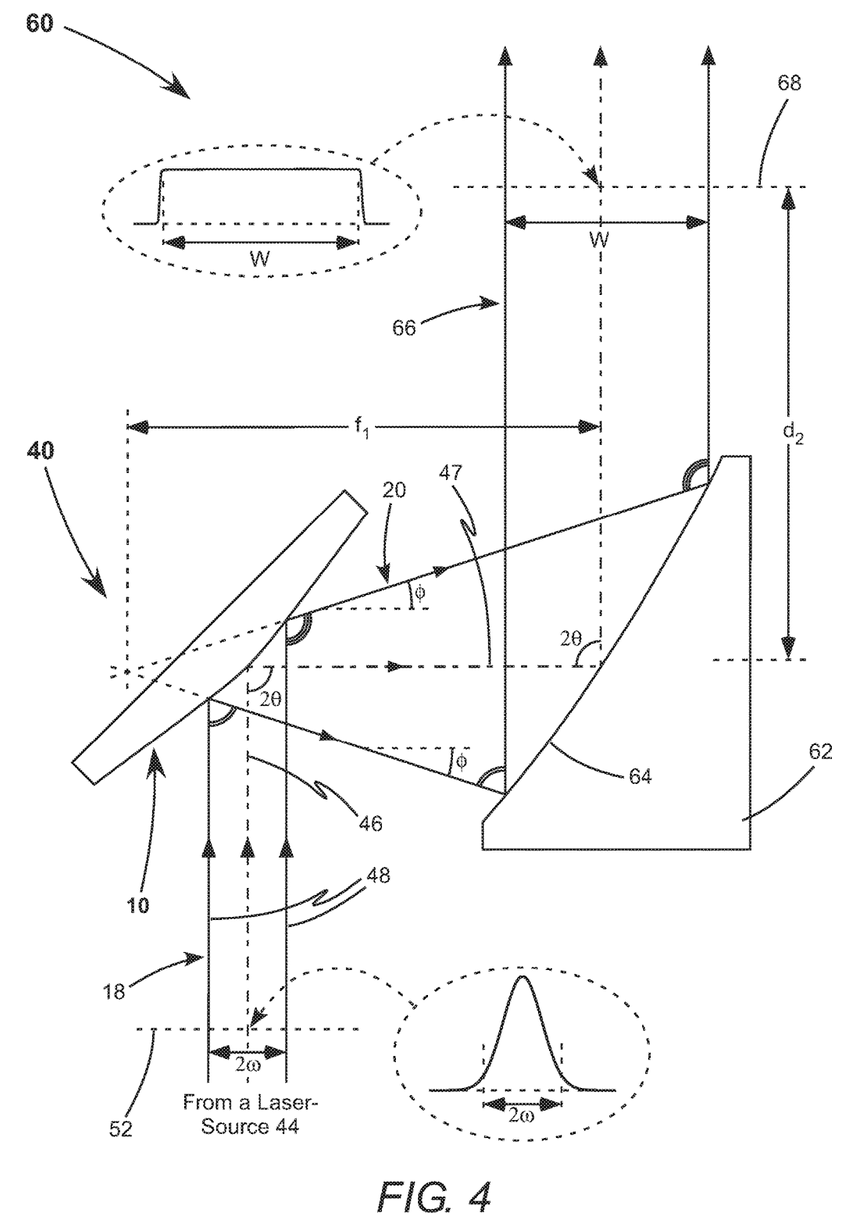
FIG. 4 schematically illustrates another preferred embodiment of flat-top beam generating apparatus in accordance with the present invention, for forming a beam of laser-radiation having a flat-top intensity distribution from a beam of laser-radiation having a Gaussian intensity distribution.

FIG. 4 schematically illustrates another preferred embodiment of flat-top beam generating apparatus 60 in accordance with the present invention. Apparatus 60 includes flat-top beam generating apparatus 40 and an off-axis mirror 62 arranged to intercept and reflect diverging beam of laser-radiation 20. Off-axis mirror 62 has a mirror-surface 64.

Mirror-surface 64 has an acylindrical shape selected to form an about collimated beam of laser-radiation 66 having an about uniform intensity distribution in a transverse illumination plane 68 having width "W". The precise shape of acylindrical mirror-surface 64 is defined by the condition that the angle-of-incidence of each ray on compound mirror-surface 10 and the angle-of-incidence of the same ray on acylindrical mirror-surface 64 are the same. Beams of laser-radiation 18, 20, and 66 are each depicted having three exemplary rays of laser-radiation 48 for convenience of illustration.

Off-axis parabolic mirrors having a variety of reflective coatings and effective focal lengths "$f_1$" are readily available, for example from Edmund Optics of Barrington, N.J. An off-axis mirror 62 having an acylindrical mirror-surface 64 that is parabolic in shape is sufficient to form an approximately-collimated beam of laser-radiation 66, particularly for a relatively large separation between compound mirror-surface 10 and acylindrical mirror-surface 64. A "relatively large separation" is defined here as $f_1 > 100\omega$. However, an acylindrical mirror-surface 64 having the precise shape defined by the condition above is necessary to form a collimated beam of laser-radiation 66.

Figure 5:
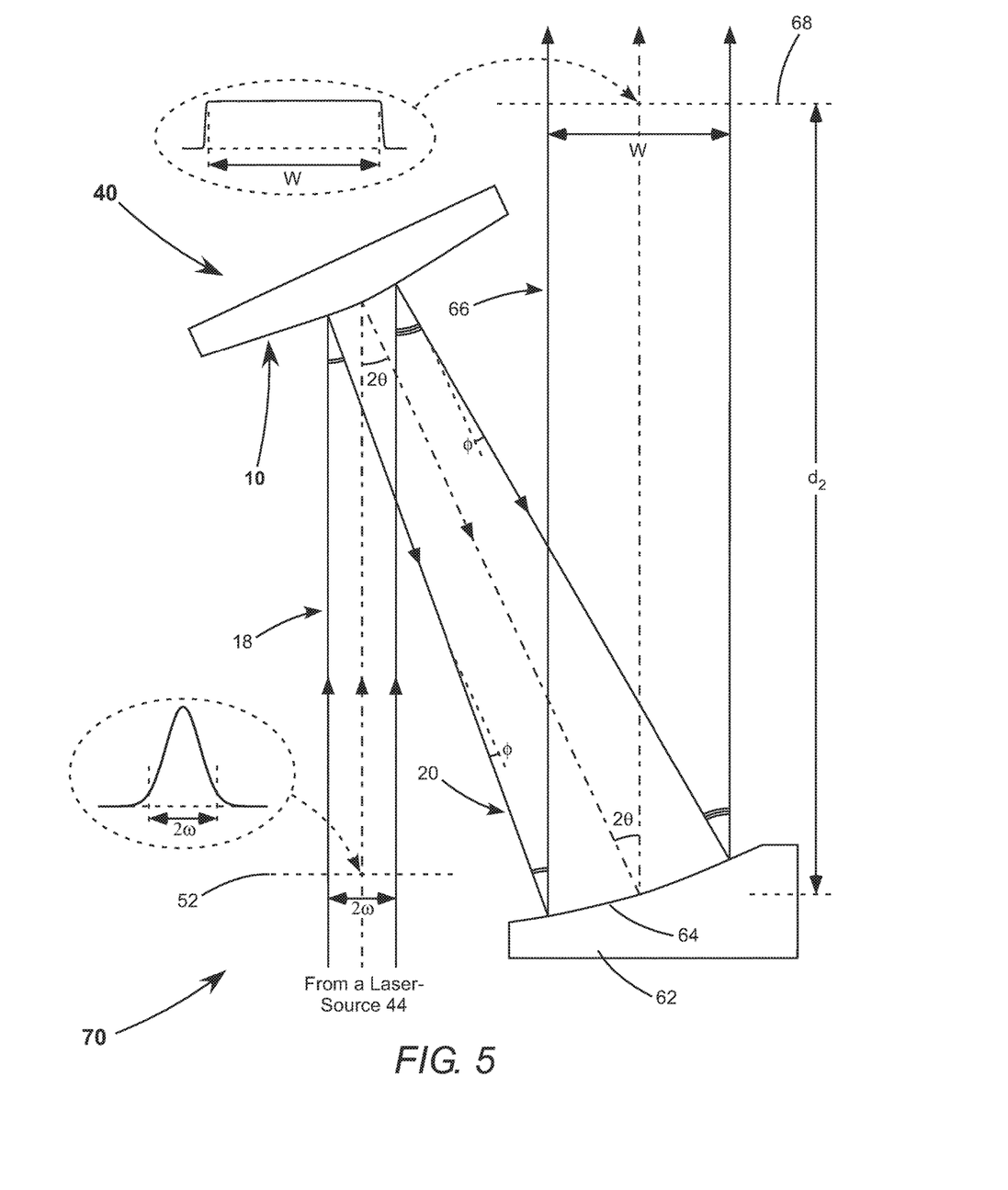
FIG. 5 schematically illustrates yet another preferred embodiment of flat-top beam generating apparatus in accordance with the present invention, for forming a beam of laser-radiation having a flat-top intensity distribution from a beam of laser-radiation having a Gaussian intensity distribution.

FIG. 5 schematically illustrates yet another preferred embodiment of flat-top beam generating apparatus 70 in accordance with the present invention. Apparatus 70 is similar to apparatus 60, but compound mirror-surface 10 and acylindrical mirror-surface 64 are designed for a smaller angle-of-incidence θ of 12.5° and a smaller angle-of-divergence φ of 5°. Compound mirror-surface 10 is flatter and more symmetric for the smaller angles in apparatus 70. The smaller angles also enable apparatus 70 to be laterally compact compared to apparatus 60 and less sensitive to the precise alignment of beams of laser-radiation 18 and 20 on the respective mirror-surfaces.

Figure 6:
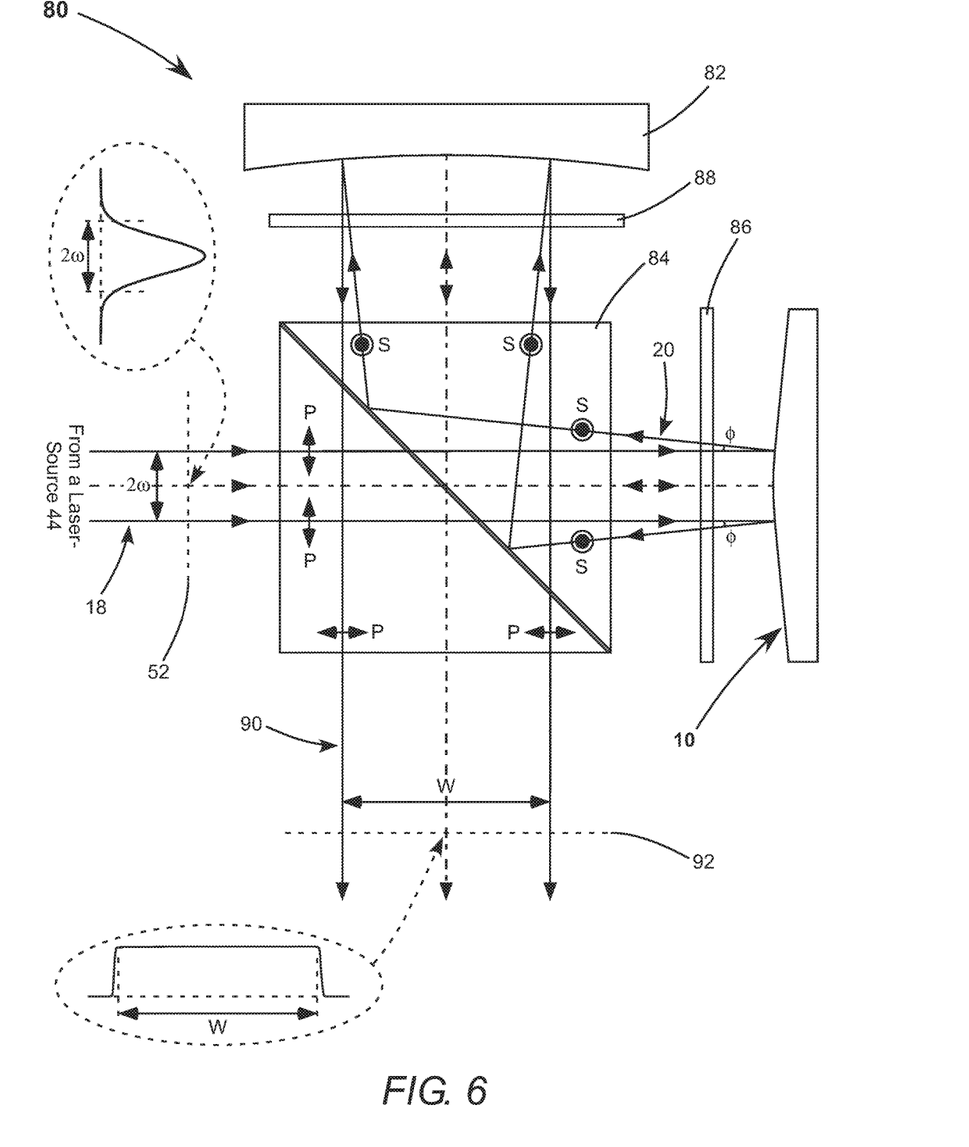
FIG. 6 schematically illustrates still another preferred embodiment of flat-top beam generating apparatus in accordance with the present invention, for forming a beam of laser-radiation having a flat-top intensity distribution from a beam of laser-radiation having a Gaussian intensity distribution.

FIG. 6 schematically illustrates still another preferred embodiment of flat-top beam generating apparatus 80 in accordance with the present invention. Apparatus 80 is similar to apparatus 60 and 70, but compound mirror-surface 10 is designed for a normal angle-of-incidence and off-axis mirror 62 is replaced by a cylindrical mirror 82. Apparatus 80 further comprises a polarizing beam-splitter 84 and quarter-wave plates 86 and 88. Compound mirror-surface 10 is symmetric for normal incidence.

Beam of laser-radiation 18 is linearly polarized. Polarizing beam-splitter 84 is arranged to intercept and transmit beam of laser-radiation 18. Here, linear polarization direction is defined with respect to the orthogonal polarization axes of polarizing beam-splitter 84. P-polarized laser-radiation is indicated by arrows "P" in the plane of the drawing and s-polarized laser-radiation is indicated by an arrowhead "S". Beam of laser-radiation 18 is p-polarized.

About collimated beam of laser-radiation 18 is normally incident on compound mirror-surface 10 and diverging beam of laser-radiation 20 is reflected from compound mirror-surface 10. The largest accessible angle-of-divergence φ is constrained by the clear apertures and angles-of-acceptance of the polarized optics. Quarter-wave plate 86 is arranged to intercept and transmit beams of laser-radiation 18 and 20. As a result of both beams of laser-radiation passing through quarter-wave plate 86, beam of laser-radiation 20 is s-polarized and is reflected by polarizing beam-splitter 84. Cylindrical mirror 82 is selected to form an about collimated beam of laser-radiation 90. Diverging beam of laser-radiation 20 is incident on cylindrical mirror 82 and about collimated beam of laser-radiation 90 is reflected from cylindrical mirror 82. Quarter-wave plate 88 is arranged to intercept and transmit beams of laser-radiation 20 and 90. As a result of both beams of laser-radiation passing through quarter-wave plate 88, about collimated beam of laser-radiation 90 is p-polarized and is transmitted through polarizing beam-splitter 84. About collimated beam of laser-radiation 90 has an about uniform intensity distribution in a transverse illumination plane 92.

Figure 7A:
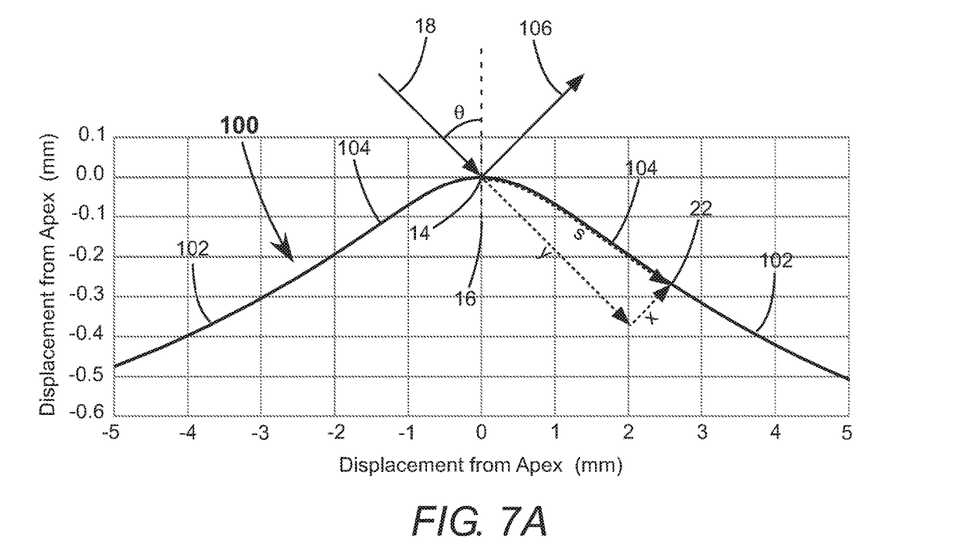
FIG. 7A is a graph schematically illustrating cross-sectional shape of a convex mirror-surface in accordance with the present invention, an apex of the mirror-surface located at the origin, the cross-sectional shape illustrated as displacement from the apex in one direction as a function of displacement from the apex in a perpendicular direction.

FIG. 7A schematically illustrates another mirror-surface 100 in accordance with the present invention. Mirror-surface 100 is similar to compound mirror-surface 10, but has a compound shape formed by two inclined concave surfaces 102 connected by rounded apex 14. A point-of-inflection 104 between each concave surface 102 and rounded apex 14 is indicated on the drawing. The compound shape of mirror-surface 100 is illustrated in cross-section by displacement parallel to normal 16 as a function of displacement perpendicular to normal 16. Compound mirror-surface 100 is designed to reflect beam of laser-radiation 18 having a Gaussian intensity distribution to form a beam of laser-radiation 106 that has an about uniform intensity distribution in a transverse plane. FIG. 7A depicts an exemplary compound mirror-surface, having the precise shape to form reflected beam of laser-radiation 106 diverging at a total angle of 36° and having a uniform intensity distribution in a transverse plane located at a distance of 20 mm from rounded apex 14, from beam of laser-radiation 18 incident thereon having a Gaussian beam-radius ω of 1.0 mm and an angle-of-incidence θ of 45°.

Figure 7B:
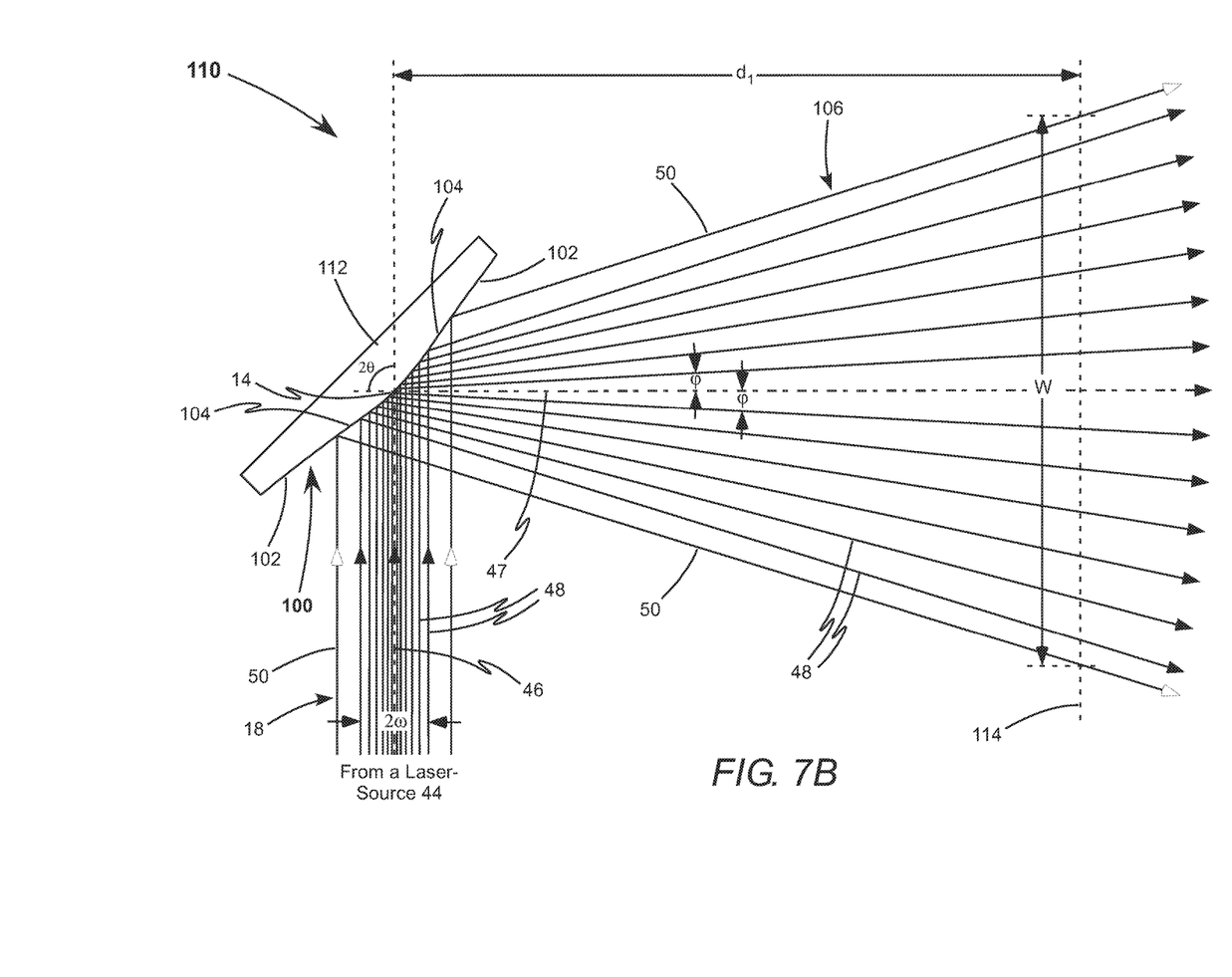
FIG. 7B schematically illustrates still another preferred embodiment of flat-top beam generating apparatus in accordance with the present invention, for forming a beam of laser-radiation having a flat-top intensity distribution from a beam of laser-radiation having a Gaussian intensity distribution.

FIG. 7B schematically illustrates still another preferred embodiment of flat-top beam generating apparatus 110 in accordance with the present invention. Apparatus 110 includes compound mirror-surface 100 of FIG. 7A, which is one surface of a substrate 112. Apparatus 110 is similar to apparatus 60 of FIG. 4, but uses only compound mirror-surface 110 to form an about uniform intensity distribution in a transverse illumination plane 114, whereas apparatus 60 has both a compound mirror-surface and an acylindrical mirror surface. Apparatus 110 forms an about uniform intensity distribution only in transverse illumination plane 114 located a specific distance "$d_1$" from rounded apex 14. In contrast, apparatus 60 forms an about collimated beam of laser-radiation having an about uniform intensity distribution over a range of distances "$d_2$", which is limited by diffraction. The about uniform intensity distribution in transverse illumination plane 114 has width "W".

Exemplary rays of laser-radiation 48 (filled arrowhead) close to beam-axis 47 in beam of laser-radiation 106 diverge at the same common angle φ as in apparatus 60. Although not depicted in the drawing, rays in beam of laser-radiation 18 incident on points-of-inflection 104 diverge from beam-axis 47 at the maximum angle-of-divergence $\varphi_{max}$. Peripheral rays of laser-radiation 50 (unfilled arrow head) are incident on the two concave surfaces 102 of compound mirror-surface 100. Peripheral rays of laser-radiation 50 diverge from beam-axis 47 at angles-of-divergence less than $\varphi_{max}$. For exemplary compound mirror-surface 100 above, $\varphi_{max}$ is 18°. It should be noted that all the elements of FIG. 7B are rendered accurately to the same scale, including compound mirror-surface 100 and all rays of laser-radiation.

Figure 7C:
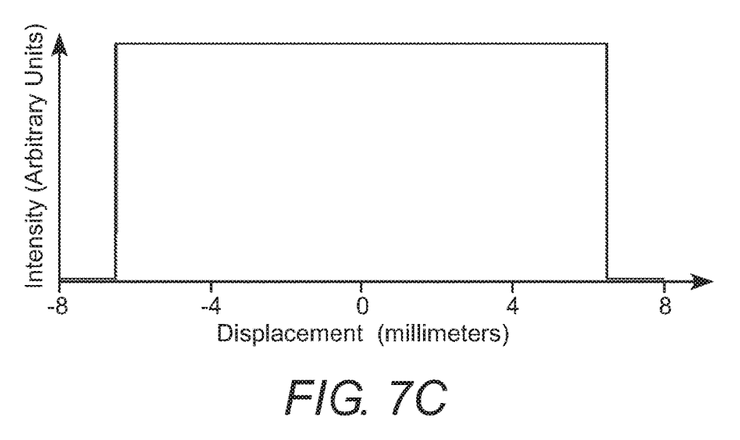
FIG. 7C schematically illustrates the calculated intensity distribution for a beam of laser-radiation formed by the flat-top beam generating apparatus of FIG. 7B.

FIG. 7C schematically illustrates calculated intensity distribution of beam of laser-radiation 106 in transverse illumination plane 114 located at a distance $d_1$ of 20 mm from rounded apex 14. Width "W" is 13 mm (2×20 mm×tan 18°) for exemplary compound mirror-surface 100 above.

Figure 8:
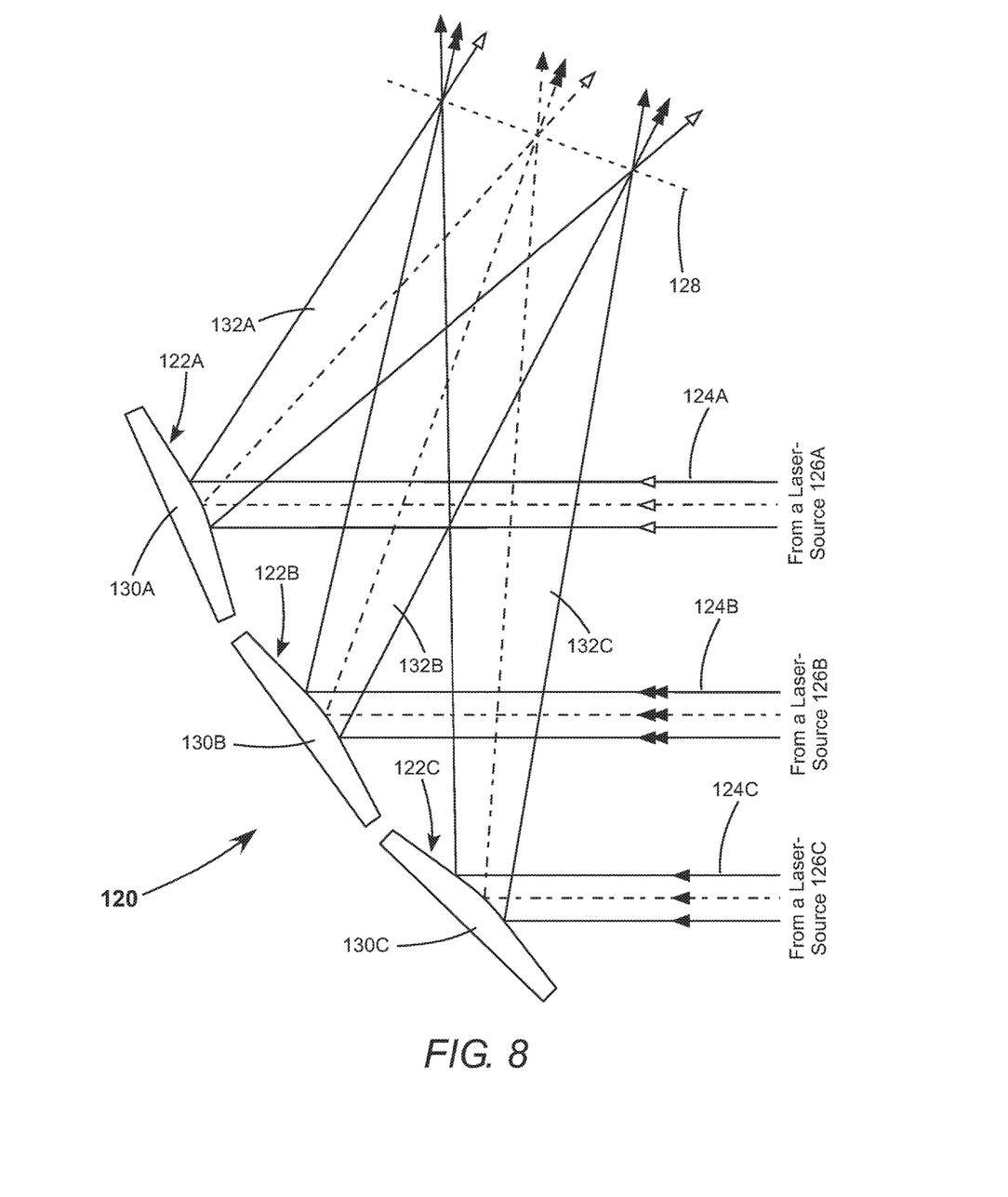
FIG. 8 schematically illustrates still yet another preferred embodiment of flat-top beam generating apparatus in accordance with the present invention, for combining beams of laser-radiation from a plurality of laser-sources having a Gaussian intensity distributions to uniformly illuminate a planar surface.

FIG. 8 schematically illustrates still another preferred embodiment of flat-top beam generating apparatus 120 in accordance with the present invention. Apparatus 120 includes a plurality of mirror-surfaces 122A, 122B, and 122C to combine beams of laser-radiation 124A, 124B, and 124C from a plurality of laser-sources 126A, 126B, and 126C (not depicted). Mirror-surfaces 122A, 122B, and 122C have the compound shape of mirror-surface 100 of FIG. 7A, but each mirror-surface is designed for a specific angle-of-incidence and a specific distance to a common illumination plane 128. Compound mirror-surfaces 122A, 122B, and 122C may be surfaces of individual substrates 130A, 130B, and 130C as depicted or may be different sections of a combined compound mirror-surface. Beams of laser-radiation 124A, 124B, and 124C may have the same wavelengths or overlapping broadband wavelengths or different wavelengths, without departing from the spirit and scope of the present invention. Reflected beams of laser-radiation 132A, 132B, and 132C each have an about uniform intensity distribution in common illumination plane 128 and combine to form a unified flat-top beam containing all the wavelengths in all the beams of laser-radiation.

Figure 9A:
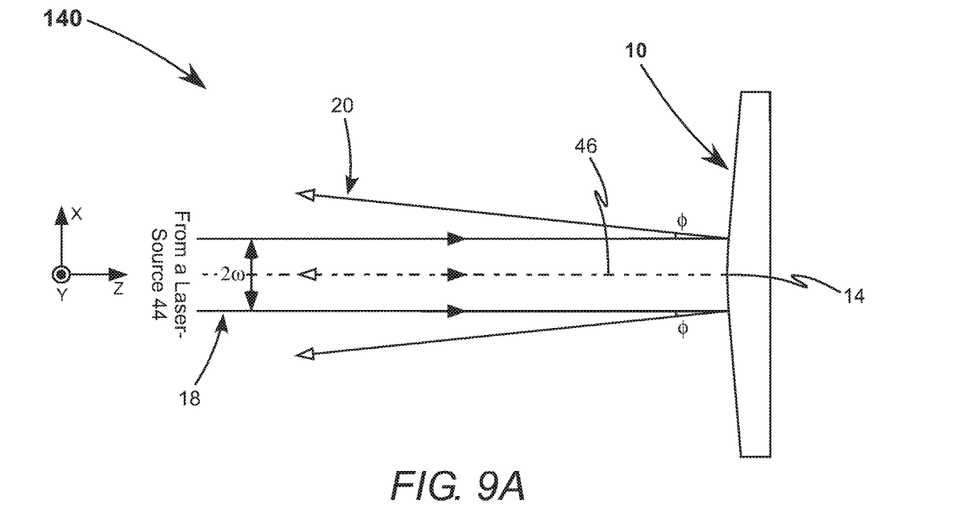
FIG. 9A is a plan view from above schematically illustrating still yet another preferred embodiment of flat-top beam generating apparatus in accordance with the present invention, similar to the embodiment of FIG. 2A, but the beams of laser-radiation propagating in a plane perpendicular to the divergence direction of the isotropic beam of laser-radiation.
Figure 9B:
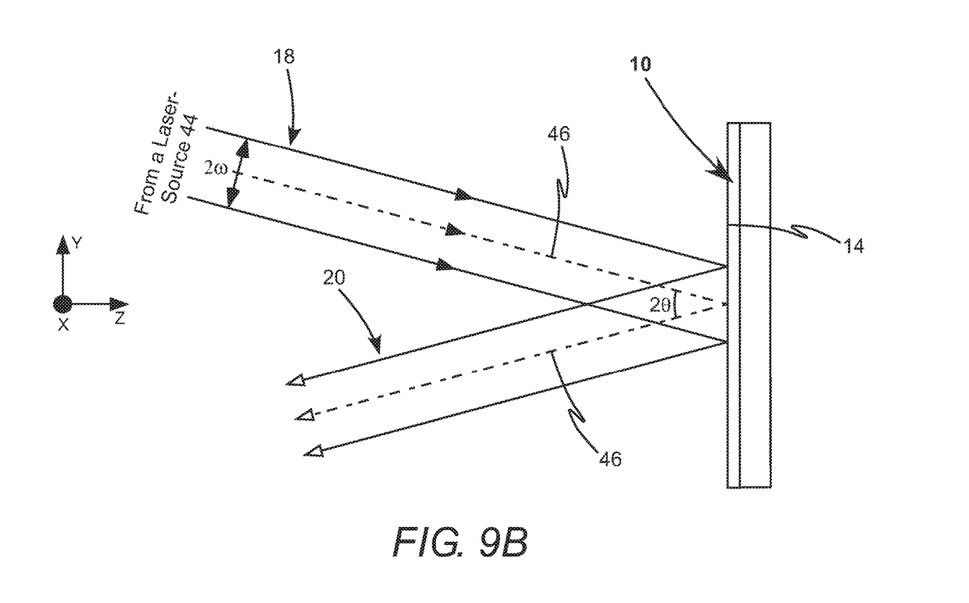
FIG. 9B is a side-elevation view of the flat-top beam generating apparatus of FIG. 9A.

FIGS. 9A and 9B schematically illustrate still another preferred embodiment of flat-top beam generating apparatus 140 in accordance with the present invention. Apparatus 140 has incident beam of laser-radiation 18 and reflected beam of laser-radiation 20 propagating in a plane YZ that is perpendicular to a direction X in which reflected beam of laser-radiation 20 diverges. In contrast, apparatus 40 of FIG. 2A, apparatus 60 of FIG. 4, and apparatus 70 of FIG. 5 have the incident and reflected beams of laser-radiation propagating in a common plane that includes the direction in which the reflected beam of laser-radiation diverges. That common plane is also the plane of each drawing. Compound mirror-surface 10 is symmetric about the plane YZ in apparatus 140. FIGS. 9A and 9B depict an exemplary angle-of-incidence θ of 15° and an exemplary angle-of-divergence φ of 6°.

Apparatus 140 may be combined with apparatus 40 of FIG. 2A to form a beam of laser-radiation having an isotropic intensity distribution in two axes perpendicular to the beam-axis. Similarly, apparatus 140 may be combined with apparatus 60 of FIG. 4 or apparatus 70 of FIG. 5 to form a beam of laser-radiation having a flat-top intensity distribution in two axes perpendicular to the beam-axis. Such a combined apparatus would uniformly illuminate a rectangular area in a transverse illumination plane. All such combinations use only reflective optics to form uniform intensity distributions in two dimensions and are therefore achromatic for a polychromatic beam of laser-radiation.

Returning to FIG. 1A, the precise shape of compound mirror-surface 10 may be defined differentially in parametric form. Each point 22 on compound mirror-surface 10 is located at displacement "y" parallel to beam of laser-radiation 18, displacement "x" perpendicular to beam of laser-radiation 18, and displacement "s" along compound mirror-surface 10 from the origin at rounded apex 14. The precise shape of compound mirror-surface 10 is:

$$\frac{dx(s)}{ds} = \cos\left[\theta + \frac{\phi_{max}}{2}\mathrm{erf}\left[\sqrt{2}\frac{x(s)}{\omega}\right]\right] \qquad (2)$$

$$\frac{dy(s)}{ds} = \sin\left[\theta + \frac{\phi_{max}}{2}\mathrm{erf}\left[\sqrt{2}\frac{x(s)}{\omega}\right]\right] \qquad (3)$$

$$x(0) = 0 \qquad (4)$$

$$y(0) = 0, \qquad (5)$$

where "erf" denotes the error function, which is here:

$$\text{erf}\left[\sqrt{2}\,\frac{x(s)}{\omega}\right] = \frac{2}{\sqrt{\pi}} \int_0^{\sqrt{2}\,\frac{x(s)}{\omega}} e^{-t^2}\, dt. \quad (6)$$

$\omega$ is the Gaussian beam-radius of the incident beam of laser-radiation, $\theta$ is the angle-of-incidence, and $\varphi_{max}$ is the maximum angle-of-divergence of the reflected beam of laser-radiation, depicted in FIG. 2A. It should be noted that the shape of compound mirror-surface 10 in FIG. 1A may be transformed into the shape of compound mirror-surface 30 in FIG. 1B by reflection about x then reflection about y.

Returning to FIG. 7A, the precise shape of compound mirror-surface 100 is similarly defined differentially in parametric form as:

$$\frac{dx(s)}{ds} = \cos\left[\theta + \frac{1}{2}\arctan\left[\frac{\frac{W}{2}\text{erf}\left[\sqrt{2}\,\frac{x(s)}{\omega}\right] - y(s)}{d_1 - x(s)}\right]\right] \quad (7)$$

$$\frac{dy(s)}{ds} = \sin\left[\theta + \frac{1}{2}\arctan\left[\frac{\frac{W}{2}\text{erf}\left[\sqrt{2}\,\frac{x(s)}{\omega}\right] - y(s)}{d_1 - x(s)}\right]\right] \quad (8)$$

$$x(0) = 0 \quad (9)$$

$$y(0) = 0. \quad (10)$$

W is the width of the uniform intensity distribution located distance $d_1$ from the rounded apex, depicted in FIG. 7B.

Although apparatus 40, 60, 70, and 80 are depicted having a convex compound mirror-surface 10, they could have an equivalent concave compound mirror-surface 30. A convex compound mirror-surface 10 is generally preferred because the distance $d_1$ required to achieve an isotropic intensity distribution sufficient for an application is shorter than it would be for the equivalent concave compound mirror-surface 30. For example, in FIG. 2A exemplary rays 48 in beam of laser-radiation 20 diverge from a virtual location behind compound mirror-surface 10. Similarly, in FIG. 4, dotted lines depict the exemplary rays diverging from a virtual location behind the compound mirror-surface. In contrast, the exemplary rays would diverge from a location in front of the equivalent concave compound mirror-surface 30.

The present invention is described above in terms of a preferred embodiment and other embodiments. The invention is not limited, however, to the embodiments described and depicted herein. Rather, the invention is limited only by the claims appended hereto.

What is claimed is:

1. Optical apparatus for receiving a beam of laser-radiation having a non-uniform intensity distribution and a first beam-axis and forming a beam of laser-radiation having an about uniform intensity distribution and a second beam-axis, the apparatus comprising:
   a substrate; and
   a compound mirror-surface on the substrate, the compound mirror-surface having a rounded apex and being reflective to the beam of laser-radiation having the non-uniform intensity distribution; and
   wherein, the beam of laser-radiation having the non-uniform intensity distribution is incident on the compound mirror-surface, the first beam-axis is incident on the rounded apex of the compound mirror-surface, and the beam of laser-radiation having the about uniform intensity distribution is reflected from the compound mirror-surface.

2. The apparatus of claim 1, wherein the compound mirror-surface has two inclined planar surfaces connected by the rounded apex.

3. The apparatus of claim 1, wherein the compound mirror-surface has two inclined concave surfaces connected by the rounded apex.

4. The apparatus of claim 1, wherein the compound mirror-surface is convex.

5. The apparatus of claim 1, wherein the compound mirror-surface is concave.

6. The apparatus of claim 1, wherein the beam of laser-radiation having the non-uniform intensity distribution is non-normally incident on the compound mirror-surface.

7. The apparatus of claim 6, wherein the compound mirror-surface is asymmetrical about the rounded apex thereof.

8. The apparatus of claim 1, wherein the beam of laser-radiation having the non-uniform intensity distribution is normally incident on the compound mirror-surface.

9. The apparatus of claim 8, wherein the compound mirror-surface is symmetrical about the rounded apex thereof.

10. The apparatus of claim 1, wherein the non-uniform intensity distribution is a Gaussian intensity distribution.

11. The apparatus of claim 1, wherein the about uniform intensity distribution is an isotropic intensity distribution up to a maximum angle-of-divergence from the second beam-axis.

12. The apparatus of claim 1, wherein the about uniform intensity distribution is a flat-top intensity distribution on a cylindrical illumination surface, the cylindrical illumination surface having the rounded apex of the mirror-surface as the center-of-curvature thereof.

13. The apparatus of claim 1, wherein the about uniform intensity distribution is a flat-top intensity distribution on an illumination plane, the illumination plane being tangential to the second beam-axis.

14. The apparatus of claim 1, wherein the beam of laser-radiation having the non-uniform intensity distribution is polychromatic.

15. The apparatus of claim 1, further including an off-axis mirror having an acylindrical mirror-surface, the off-axis mirror arranged such that the acylindrical mirror-surface intercepts and reflects the beam of laser-radiation having an about uniform intensity distribution.

16. The apparatus of claim 15, wherein the acylindrical mirror-surface has a parabolic shape.

17. The apparatus of claim 1, further including a cylindrical mirror arranged to intercept and reflect the beam of laser-radiation having an about uniform intensity distribution.

18. The apparatus of claim 17, further including a polarizing beam-splitter and two quarter-wave plates, the polarizing beam-splitter arranged to intercept and transmit the beam of laser-radiation having a non-uniform intensity distribution and reflect the beam of laser-radiation having an about uniform intensity distribution, the two quarter-wave plates arranged to intercept and transmit the beam of laser-radiation having an about uniform intensity distribution.

19. Optical apparatus for transforming a Gaussian beam of laser-radiation having a first beam-axis into an isotropic beam of laser-radiation having a second beam-axis, comprising:

a substrate; and a mirror-surface on the substrate, the mirror-surface having a rounded apex, the mirror-surface being reflective at a wavelength of the Gaussian beam of laser-radiation;

wherein, the Gaussian beam of laser-radiation has a Gaussian intensity distribution, the Gaussian beam of laser-radiation is incident on the mirror-surface, the first beam-axis is incident on the rounded apex of the mirror-surface, the isotropic beam of laser-radiation is reflected from the mirror-surface, and the isotropic beam of laser-radiation has an isotropic intensity distribution up to a maximum angle-of-divergence from the second beam-axis.

20. Optical apparatus for transforming a Gaussian beam of laser-radiation into a flat-top beam of laser-radiation, comprising:

a substrate; and a mirror-surface on the substrate, the mirror-surface having a rounded apex, the mirror-surface being reflective at a wavelength of the Gaussian beam of laser-radiation;

wherein, the Gaussian beam of laser-radiation has a Gaussian intensity distribution and a beam-axis, the Gaussian beam of laser-radiation is incident on the mirror-surface, the beam-axis is incident on the rounded apex of the mirror-surface, and the flat-top beam of laser-radiation is reflected from the mirror-surface.

\* \* \* \* \*